US009256102B1

United States Patent
Hsiao et al.

(10) Patent No.: US 9,256,102 B1
(45) Date of Patent: Feb. 9, 2016

(54) BACKLIGHT MODULE AND LIQUID CRYSTAL DISPLAY DEVICE

(71) Applicant: Shenzhen China Star Optoelectronics Technology Co., Ltd., Shenzhen, Guangdong (CN)

(72) Inventors: Yuchun Hsiao, Guangdong (CN); Chengwen Que, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 14/399,938

(22) PCT Filed: Oct. 8, 2014

(86) PCT No.: PCT/CN2014/088152
§ 371 (c)(1),
(2) Date: Nov. 7, 2014

(51) Int. Cl.
*G02F 1/1335* (2006.01)
*F21V 8/00* (2006.01)

(52) U.S. Cl.
CPC .......... *G02F 1/133608* (2013.01); *G02B 6/005* (2013.01); *G02B 6/0031* (2013.01); *G02B 6/0088* (2013.01); *G02F 1/133524* (2013.01)

(58) Field of Classification Search
CPC .............. G02F 1/133615; G02F 2001/133314; G02F 2001/133317; G02F 2202/465; G02F 1/133308; G02B 6/0093; G02B 6/0088
See application file for complete search history.

(56) References Cited

U.S. PATENT DOCUMENTS

2013/0308074 A1* 11/2013 Park ..................... G02B 6/0088
349/58

* cited by examiner

*Primary Examiner* — Richard Kim
*Assistant Examiner* — Kendrick Hsu
(74) *Attorney, Agent, or Firm* — Andrew C. Cheng

(57) ABSTRACT

The present invention discloses a backlight module, comprising a backsheet, and a light guide plate and a middle frame provided on the backsheet; the backsheet being assembled with multiple spacers, one side of the spacer being connected with the side wall of the backsheet, the opposite side thereof being tightly connected with the light guide plate, on the spacer further being provided with a holding groove; a slot connected to the holding groove being provided corresponding to each spacer on the side wall of the backsheet; the middle frame comprising a vertical supporting portion, the vertical supporting portion comprising multiple intertongue, each intertongue corresponding to each holding groove, on the side wall of the intertongue being provided with a hook; the middle frame being assembled in the holding groove through the intertongue, the hook and the slot being engaged with each other. The present invention further discloses a liquid crystal display device comprising the backlight module.

18 Claims, 2 Drawing Sheets

BACKLIGHT MODULE AND LIQUID CRYSTAL DISPLAY DEVICE

BACKGROUND OF THE INVENTION

1. Field of the Invention

The present invention relates to the fields of liquid crystal display, and in particular to a backlight module and a liquid crystal display device.

2. The Related Arts

The liquid crystal display (LCD) has the advantages of thin body, low power consumption, no radiation, etc., which has been widely applied, such as mobile phones, digital cameras, computers, television screens, etc. On the existing liquid crystal display market, most are the backlight-type liquid crystal display, which comprises a liquid crystal panel and a backlight module, and the liquid crystal panel and the backlight module are provided opposite to each other. The backlight module provides a display light source for the liquid crystal panel, so that the liquid crystal panel displays images. In the increasingly competitive display market, differentiated design has become one of the important research directions to enhance the selling of the products for the manufacturers. In the conventional products, the common design are thinner or narrow frame, which has more aesthetic appearance to attract the attention of consumers.

FIG. 1 shows a schematic structure of the backlight module according to the existing technology, which comprises a backsheet 1, and a reflective plate 2, a light guide plate 3 and a diaphragm set 4 sequentially arranged on the backsheet 1, which further comprises a middle frame 5 fixing with the backsheet 1. The vertical supporting portion of the middle frame 5 comprises an inner wall 6 and an outer wall 7. A groove is formed between the inner wall 6 and the outer wall 7, and on the outer wall 7 is provided with a slot 8. On the side wall of the backsheet 1 is provided with a hook 9. The side wall of the backsheet 1 is inserted into the above groove, and the hook 9 and the slot 8 are engaged with each other, so that the backsheet 1 and the middle frame 5 are fixed with each other. In the structure of the backlight module, because the vertical supporting portion of the middle frame 5 comprises the inner wall 6 and the outer wall 7, the presence of the outer wall 7 increase the frame width of the liquid crystal display module, which is not beneficial to the design of the narrow frame structure. Moreover, in the structure, the middle frame 5 can limit the light guide plate 3 in the vertical direction, but limitation of the transverse direction of the light guide plate 3 needs another defining unit, which increases the complexity of the structure of backlight module.

SUMMARY OF THE INVENTION

For the deficiencies of the prior art, the present invention provides a backlight module, which improves the structure of the backsheet and the middle frame fixing with each other, efficiently decreasing the frame width of the liquid crystal display module, which is beneficial to the design of liquid crystal display device with narrow frame structure.

In order to achieve the above object, the present invention provides the following technology: a backlight module, comprising a backsheet, and a light guide plate and a middle frame provided on the backsheet; the backsheet being assembled with multiple spacers, one side of the spacer being connected with a side wall of the backsheet, the opposite side thereof being tightly connected with the light guide plate, on the spacer further being provided with a holding groove; a slot connected to the holding groove being provided corresponding to each spacer on the side wall of the backsheet; the middle frame comprising a vertical supporting portion, the vertical supporting portion comprising multiple intertongue, each intertongue corresponding to each holding groove, on the side wall of the intertongue being provided with a hook; the middle frame being assembled in the holding groove through the intertongue, the hook and the slot being engaged with each other.

Wherein, the spacer is made of an elastic material.

Wherein, the spacer is connected with the side wall of the backsheet through paste.

Wherein, the middle frame further comprises a transverse supporting portion, the transverse supporting portion and the vertical supporting portion are connected with each other, and one end of the transverse supporting portion extends to be flush with the side wall of the backsheet.

Wherein, the light guide plate is further provided with an optical film set, the transverse supporting portion is closely pressed on the optical film set.

Wherein, the transverse supporting portion is closely pressed on the upper plane of the spacer.

Wherein, a reflector is provided between the backsheet and the light guide plate.

Wherein, the middle frame is made of a plastic material.

The present invention further provides a liquid crystal display device, comprising a liquid crystal panel and a backlight module, the liquid crystal panel and the backlight module being provided opposite to each other, the backlight module providing a display light source for the liquid crystal panel, so that the liquid crystal panel displays images; wherein, the backlight module is the mentioned backlight module.

In the backlight module according to the present embodiment, it provides a spacer at the inner side of the side wall of the backsheet, and provides a holding groove on the spacer. The vertical supporting portion of the middle frame comprises an intertongue with a hook. The intertongue is inserted into the holding groove, so that the hook and the slot on the side wall of the backsheet are engaged with each other, and the backsheet and the middle frame are fixed with each other. In the structure, the vertical supporting portion of the middle frame only needs one supporting wall, which effectively reduces the frame width of the liquid crystal display module, which is beneficial to the design of liquid crystal display device with narrow frame structure. At the same time, one side of the spacer is connected with the side wall of the backsheet, and the opposite side thereof is tightly connected with the light guide plate, so it can limits the light guide plate in the transverse direction.

DETAILED DESCRIPTION OF THE PREFERRED EMBODIMENTS

In order to better illustrate the technical characteristics and structure of the present invention, the detailed descriptions accompanying drawings and the embodiment of the present invention are as follows.

Figure 1:
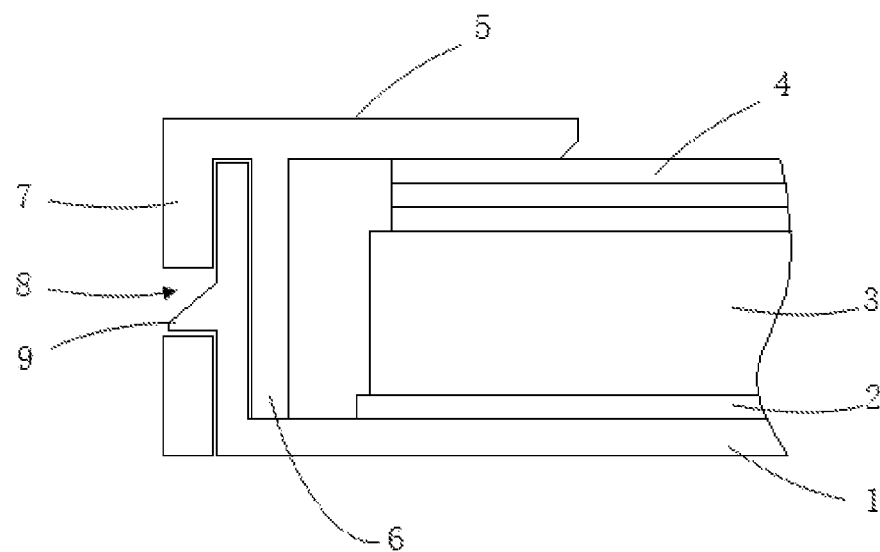
FIG. 1 is a schematic structure of the backlight module according to the existing technology.
Figure 2:
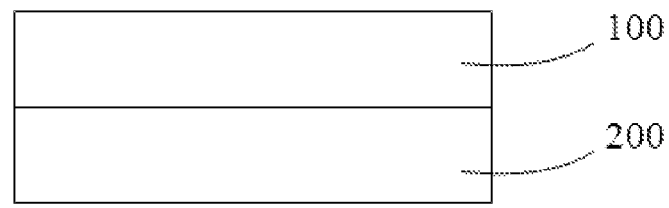
FIG. 2 is a schematic structure of the liquid crystal display device according to the embodiment of the present invention.

FIG. 2 is a schematic structure of the liquid crystal display device according to the embodiment of the present invention. As shown in FIG. 2, the liquid crystal display device comprises a liquid crystal panel 100 and a backlight module 200. The liquid crystal panel 100 and the backlight module 200 are provided opposite to each other. The backlight module 200 provides a display light source for the liquid crystal panel 100, so that the liquid crystal panel 100 displays images.

Figure 3:
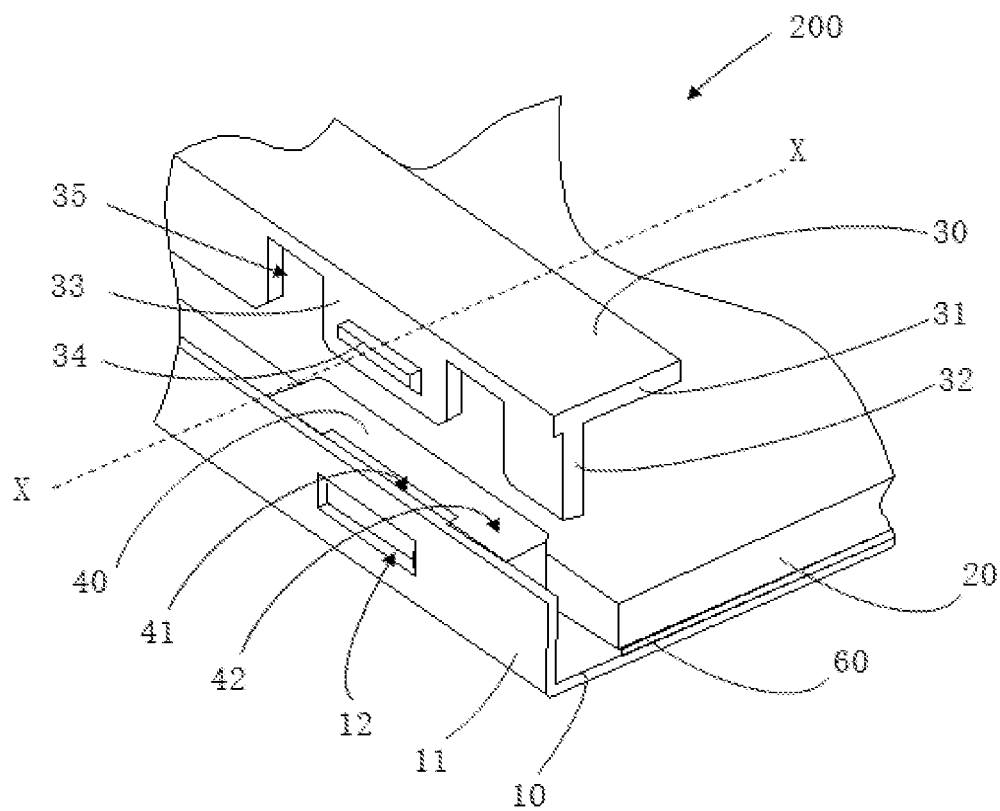
FIG. 3 is a schematic structure of the backlight module according to the embodiment of the present invention.
Figure 4:
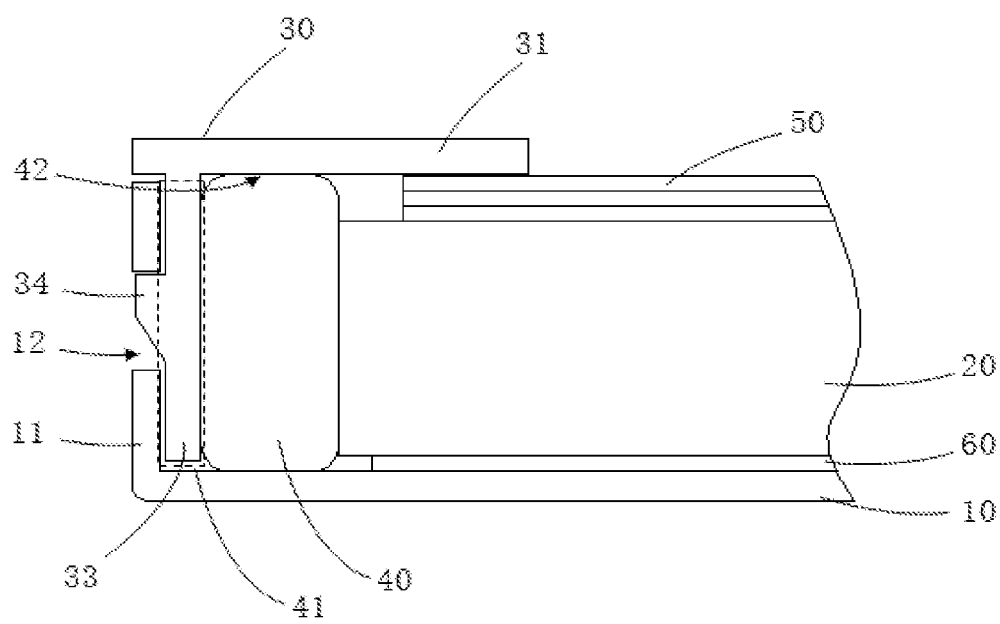
FIG. 4 is a cross-sectional view along the line XX of the backlight module in FIG. 3 after assembling the middle frame.

Referring to FIGS. 3 and 4, the backlight module 200 at least comprises a backsheet 10, and a light guide plate 20 and a middle frame 30 provided on the backsheet 10. The backsheet 30 is further assembled with multiple spacers 40 (the quantity of the spacers should be selected according to the area of the liquid crystal display device, the drawing only shows an exemplary one of which). One side of the spacer 40 is connected with a side wall 11 of the backsheet 10, and the opposite side thereof is tightly connected with the light guide plate 20. On the spacer 40 further is provided with a holding groove 41. A slot 12 connected to the holding groove 41 is provided corresponding to each spacer 40 on the side wall of the backsheet 10. The middle frame 30 comprises a transverse supporting portion 31 and a vertical supporting portion 32. The transverse supporting portion 31 and the vertical supporting portion 32 are approximately perpendicularly connected with each other, forming an inverted "L" shaped structure. The vertical supporting portion 32 comprises multiple intertongue 33. Each intertongue 33 corresponds to each holding groove 41. On the side wall of the intertongue 33 is provided with a hook 34. Two sides of the intertongue 33 are respectively provided with anti-collision grooves 35. The middle frame 30 is assembled in the holding groove 41 through the intertongue 33. The hook 34 and the slot 12 are engaged with each other. As shown in FIG. 4, the backlight module 200 further comprises a reflector 60 and an optical film set 50. The reflector 60 is provided between the backsheet 10 and the light guide plate 20. The optical film set 50 is provided on the light guide plate 20 (on the light exiting surface of the light guide plate 20).

In the present embodiment, the spacer 40 is made of an elastic material. The spacer 40 is connected with the side wall 11 of the backsheet 10 through paste. The middle frame 30 is made of a plastic material.

As shown in FIG. 4, comparing to FIG. 3, FIG. 4 shows the optical film set 50 on the light exiting surface of the light guide plate 20, and the middle frame 30 is assembled in the spacer 40 of the holding groove 41 through the intertongue 33. In the present embodiment, after the middle frame 30 is inserted into the spacer 40 on the backsheet 10, the hook 34 and the slot 12 are engaged with each other to prevent the frame 30 ejected from the backplane 10. The transverse supporting portion 31 of the middle frame 30 is closely pressed on the optical film set 50, which limits the light guide plate 20 in the vertical direction. At the same time, the transverse supporting portion 31 is closely pressed on an upper plane 42 of the spacer 40. One side of the spacer 40 is closely connected with the end face of the light guide plate 20, which limits the light guide plate 20 in the transverse direction. Furthermore, one end of the transverse supporting portion 31 of the middle frame 30 extends to be flush with the side wall 11 of the backsheet 10. Namely, the end face of the transverse supporting portion 31 is flush with the outside of the sidewall 11 of the backsheet 10.

In the backlight module according to the above embodiment, it provides a spacer at the inner side of the side wall of the backsheet, and provides a holding groove on the spacer. The vertical supporting portion of the middle frame comprises an intertongue with a hook. The intertongue is inserted into the holding groove, so that the hook and the slot on the side wall of the backsheet are engaged with each other, and the backsheet and the middle frame are fixed with each other. In the structure, the vertical supporting portion of the middle frame only needs one supporting wall, which effectively reduces the frame width of the liquid crystal display module, which is beneficial to the design of liquid crystal display device with narrow frame structure.

It needs to notice that, in this article, the relational terms such as first and second is only used to distinguish one entity or operating another entity or an operation, it is not necessary to require or imply that there exists any such relationship or sequence between the entity and operation. Besides, the terms "comprise," "include," or any other variation are intended to cover a non-exclusive inclusion, thereby making that comprising a series of process, method, materials or apparatus of element not only comprise those elements, but also comprise other elements not expressly listed, or also comprise such inherent elements of process, method, materials or apparatus. In the absence of more restrictive conditions, limiting the elements by the statement "comprises a . . . ", it doesn't exclude that it also exists other identical elements in comprising the process, method, materials or apparatus of element.

Obviously, the scope of the present invention is not limited to the specific embodiments mentioned above, and those skilled in the art may make various changes to the invention and variations without departing from the spirit and scope of the present invention. Therefore, if such modifications and variations within the present invention belong to the claims and the scope of the equivalent technique of the present invention, the present invention is also intended to include these modifications and variations.

What is claimed is:

1. A backlight module, comprising a backsheet, and a light guide plate and a middle frame provided on the backsheet; the backsheet being assembled with multiple spacers, one side of each spacer being connected with a side wall of the backsheet, the opposite side thereof being tightly connected with the light guide plate, on each spacer further being provided with a holding groove; a slot connected to the holding groove being provided corresponding to each spacer on the side wall of the backsheet; the middle frame comprising a vertical supporting portion, the vertical supporting portion comprising multiple intertongue, each intertongue corresponding to each holding groove, on the side wall of each intertongue being provided with a hook; the middle frame being assembled in the holding groove through each intertongue, the hook and the slot being engaged with each other.

2. The backlight module as claimed in claim 1, wherein each spacer is connected with the side wall of the backsheet through paste.

3. The backlight module as claimed in claim 1, wherein each spacer is made of an elastic material.

4. The backlight module as claimed in claim 3, wherein each spacer is connected with the side wall of the backsheet through paste.

5. The backlight module as claimed in claim 1, wherein the middle frame further comprises a transverse supporting portion, the transverse supporting portion and the vertical supporting portion are connected with each other, and one end of the transverse supporting portion extends to be flush with the side wall of the backsheet.

6. The backlight module as claimed in claim 5, wherein the light guide plate is further provided with an optical film set, the transverse supporting portion is closely pressed on the optical film set.

7. The backlight module as claimed in claim 6, wherein the transverse supporting portion is closely pressed on an upper plane of each spacer.

8. The backlight module as claimed in claim 1, wherein a reflector is provided between the backsheet and the light guide plate.

9. The backlight module as claimed in claim 1, wherein the middle frame is made of a plastic material.

10. A liquid crystal display device, comprising a liquid crystal panel and a backlight module, the liquid crystal panel and the backlight module being provided opposite to each other, the backlight module providing a display light source for the liquid crystal panel, so that the liquid crystal panel displays images, the backlight module comprising a backsheet, and a light guide plate and a middle frame provided on the backsheet; the backsheet being assembled with multiple spacers, one side of each spacer being connected with a side wall of the backsheet, the opposite side thereof being tightly connected with the light guide plate, on each spacer further being provided with a holding groove; a slot connected to the holding groove being provided corresponding to each spacer on the side wall of the backsheet; the middle frame comprising a vertical supporting portion, the vertical supporting portion comprising multiple intertongue, each intertongue corresponding to each holding groove, on the side wall of each intertongue being provided with a hook; the middle frame being assembled in the holding groove through each intertongue, the hook and the slot being engaged with each other.

11. The liquid crystal display device as claimed in claim 10, wherein each spacer is connected with the side wall of the backsheet through paste.

12. The liquid crystal display device as claimed in claim 10, wherein each spacer is made of an elastic material.

13. The liquid crystal display device as claimed in claim 12, wherein each spacer is connected with the side wall of the backsheet through paste.

14. The liquid crystal display device as claimed in claim 10, wherein the middle frame further comprises a transverse supporting portion, the transverse supporting portion and the vertical supporting portion are connected with each other, and one end of the transverse supporting portion extends to be flush with the side wall of the backsheet.

15. The liquid crystal display device as claimed in claim 14, wherein the light guide plate is further provided with an optical film set, the transverse supporting portion is closely pressed on the optical film set.

16. The liquid crystal display device as claimed in claim 15, wherein the transverse supporting portion is closely pressed on an upper plane of each spacer.

17. The liquid crystal display device as claimed in claim 10, wherein a reflector is provided between the backsheet and the light guide plate.

18. The liquid crystal display device as claimed in claim 10, wherein the middle frame is made of a plastic material.

* * * * *